(12) United States Patent
Hojabri

(10) Patent No.: US 7,236,203 B1
(45) Date of Patent: Jun. 26, 2007

(54) VIDEO CIRCUITRY FOR CONTROLLING SIGNAL GAIN AND REFERENCE BLACK LEVEL

(75) Inventor: Peyman Hojabri, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 497 days.

(21) Appl. No.: 10/830,338

(22) Filed: Apr. 22, 2004

(51) Int. Cl.
*H04N 5/68* (2006.01)

(52) U.S. Cl. ..................................... 348/379

(58) Field of Classification Search ............... 348/379, 348/380, 377, 572, 378, 673, 687, 689; 327/308–310; 315/383
See application file for complete search history.

(56) References Cited

U.S. PATENT DOCUMENTS

| | | | | |
|---|---|---|---|---|
| 4,323,923 A | * | 4/1982 | Reneau | 348/697 |
| 4,496,982 A | * | 1/1985 | Levine | 348/243 |
| 4,549,215 A | * | 10/1985 | Levine | 348/257 |
| 4,633,320 A | * | 12/1986 | Willis | 348/380 |
| 5,351,129 A | | 9/1994 | Lai | |
| 5,386,247 A | | 1/1995 | Shafer et al. | |
| 5,461,398 A | | 10/1995 | Tang et al. | |
| 5,568,202 A | | 10/1996 | Koo | |
| 5,610,664 A | | 3/1997 | Bobert | |
| 5,786,864 A | | 7/1998 | Yamamoto | |
| 5,838,388 A | | 11/1998 | Blanc | |
| 5,953,004 A | | 9/1999 | Cho | |
| 6,069,660 A | * | 5/2000 | Sato | 348/379 |
| 6,166,579 A | | 12/2000 | Hojabri et al. | |
| 6,191,760 B1 | | 2/2001 | Jun et al. | |
| 6,226,047 B1 | | 5/2001 | Ryu | |
| 6,476,821 B2 | | 11/2002 | Sawada et al. | |
| 6,498,857 B1 | | 12/2002 | Sibbald | |
| 6,597,395 B1 | * | 7/2003 | Kim et al. | 348/222.1 |
| 6,650,371 B1 | | 11/2003 | Morrish et al. | |
| 7,042,518 B1 | * | 5/2006 | Morrish | 348/625 |

OTHER PUBLICATIONS

U.S. Appl. No. 09/698,739, filed Oct. 27, 2000, Hojabri.
U.S. Appl. No. 10/439,485, filed May 16, 2003, Hojabri.
U.S. Appl. No. 10/685,378, filed Oct. 14, 2003, Hojabri.

* cited by examiner

*Primary Examiner*—Paulos Natnael
(74) *Attorney, Agent, or Firm*—Vedder, Price, Kaufman & Kammholz, P.C.

(57) ABSTRACT

An apparatus and method for controlling signal gain and reference black level of a video signal. Magnitudes of signal gain and reference voltage for a subject video signal are determined by a common digital control signal, while the reference voltage determines the reference black level.

14 Claims, 4 Drawing Sheets

VIDEO CIRCUITRY FOR CONTROLLING SIGNAL GAIN AND REFERENCE BLACK LEVEL

BACKGROUND OF THE INVENTION

1. Field of the Invention

The present invention relates to video amplifier circuitry for controlling a signal to be displayed on a display device such as a cathode ray tube (CRT), and in particular, to video circuitry for controlling signal gain and reference block level of a video signal.

2. Description of the Related Art

Video display devices are used for many purposes, including video monitors for displaying video images generated by computers and televisions for displaying animated or live action video images such as those received over cable or broadcast systems. One of the more common types of video display devices uses a cathode ray tube (CRT) to display the video image information. As is well known, the CRT includes three primary color cathode ray guns which are manipulated to converge on a screen and produce a color image. The three ray guns produce converged scaning rasters having red, green and blue fields which combine to produce all colors from black through white. For manufacturers of such display devices, one important requirement is that of establishing and maintaining color balance by appropriately balancing the signals driving the red, green and blue (RGB) cathodes of the CRT. This is generally quite difficult since adjusting independent video gain stages for each channel (red, green, and blue) often conflicts with establishing and maintaining proper reference black level, or brightness, adjustment for each channel.

SUMMARY OF THE INVENTION

In accordance with the presently claimed invention, signal gain and reference black level of a video signal are controlled such that the magnitudes of the signal gain and a reference voltage for a subject video signal are determined by a common digital control signal, while the reference voltage determines the reference black level.

In accordance with one embodiment of the presently claimed invention, video circuitry for controlling signal gain and reference black level of a video signal includes video signal control circuitry and voltage reference generator circuitry. The video signal control circuitry is responsive to a first video signal, a reference voltage and a digital control signal by providing a second video signal corresponding to the first video signal and having a reference black level determined by a magnitude of the reference voltage, wherein the first video signal has a first magnitude, the second video signal has a second magnitude and a ratio of the first and second video signal magnitudes is determined by the digital control signal. The voltage reference generator circuitry is coupled to the video signal control circuitry and responsive to the digital control signal by providing the reference voltage with the reference voltage magnitude determined by the digital control signal.

In accordance with another embodiment of the presently claimed invention, video circuitry for controlling signal gain and reference black level of a video signal includes video signal controller means and voltage reference generator means. The video signal controller means is responding to a first video signal, a reference voltage and a digital control signal by generating a second video signal corresponding to the first video signal and having a reference black level determined by a magnitude of the reference voltage, wherein the first video signal has a first magnitude, the second video signal has a second magnitude and a ratio of the first and second video signal magnitudes is determined by the digital control signal. The voltage reference generator means is for responding to the digital control signal by generating the reference voltage with the reference voltage magnitude determined by the digital control signal.

In accordance with still another embodiment of the presently claimed invention, a method for controlling signal gain and reference black level of a video signal includes:

receiving a first video signal having a first magnitude;
receiving a digital control signal;
generating a reference voltage with a magnitude determined by the digital control signal; and
generating a second video signal having a second magnitude, corresponding to the first video signal and having a reference black level determined by a magnitude of the reference voltage, wherein a ratio of the first and second video signal magnitudes is determined by the digital control signal.

DETAILED DESCRIPTION OF THE INVENTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators.

Figure 1:
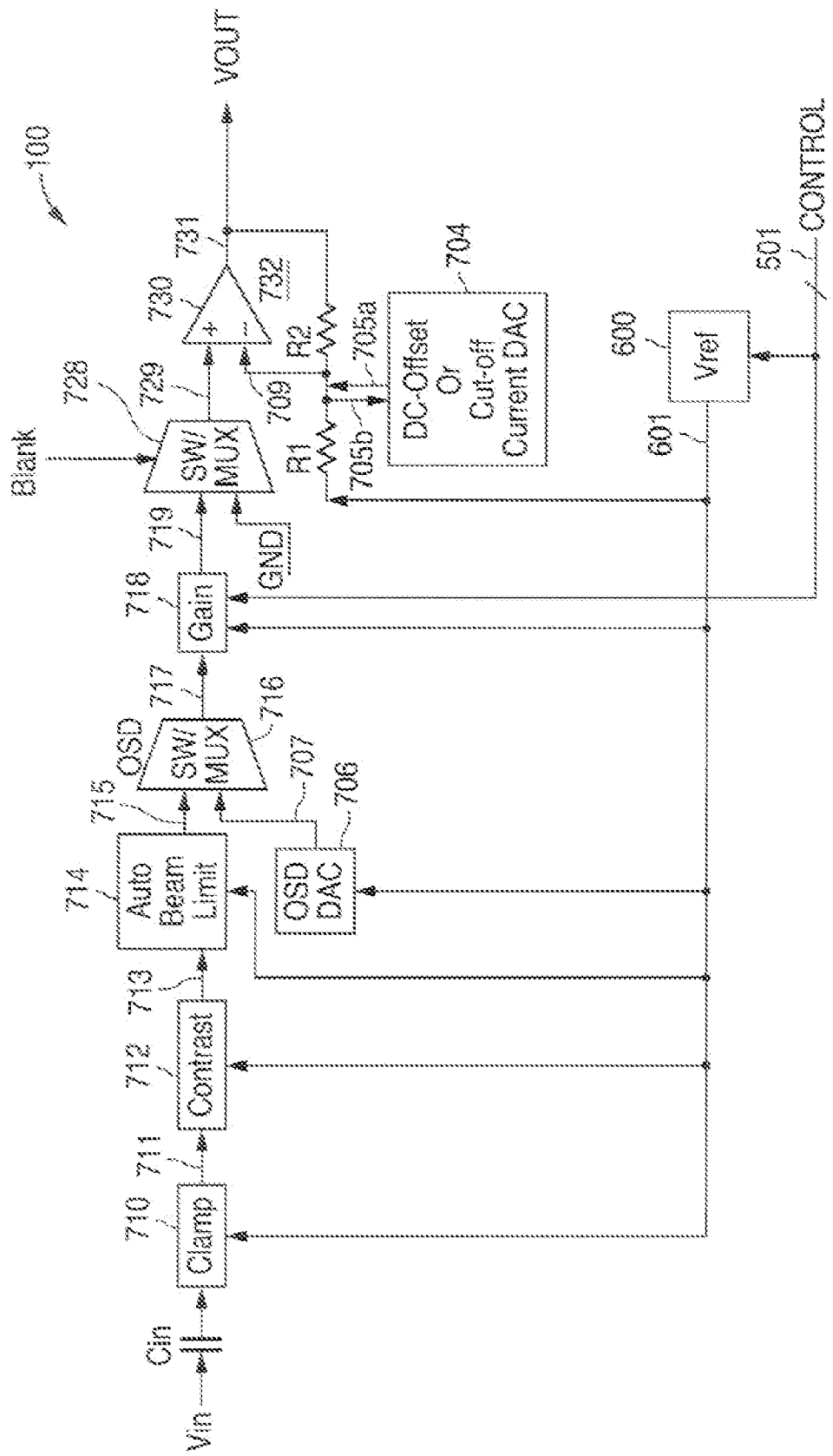
FIG. 1 is a functional block diagram of a portion of a video system for driving a video display device containing video circuitry in accordance with one embodiment of the presently claimed invention.

Referring to FIG. 1, a portion 100 of a video system including video circuitry for controlling signal gain and reference black level of a video signal in accordance with one embodiment of the presently claimed invention can be described as follows. (It should be understood that this portion 100 represents one video channel of a typical system, with three such channels being used for RGB control.) This subsystem 100 includes a clamp circuit 710, contrast control circuit 712, auto beam limit circuit 714, an on-screen-display (OSD) data source 706, a switch or multiplexor 716, a video gain circuit 718, another switch or multiplexor 728, output offset circuitry 732, and a voltage reference source 600, all connected substantially as shown. As indicated, the clamp circuit 710, contrast control circuit 712, auto beam limit circuit 714, OSD data source 706, video gain circuit 718 and output offset circuitry 732 are biased by a reference voltage 601 provided by the voltage reference generator circuit 600 (discussed in more detail below).

An incoming video signal Vin is AC-coupled with a coupling capacitor Cin to provide an AC-coupled signal to the clamp circuit 710. The DC-clamped signal 711 is then processed by the contrast control circuit 712 in accordance with contrast control signals (not shown) and the reference voltage 601 to establish the contrast for the incoming video signal. The contrast-controlled signal 713 is then processed by the auto beam limit circuit 714 (various forms of which are well known in the art) in accordance with an ABL control signal (not shown) and the reference voltage 601.

The resulting video signal 715 is then selectively combined in the switch or multiplexor 716 with OSD data 707. The resulting signal 717 is controlled with respect to signal gain by the video gain circuit 718 in accordance with the reference voltage 601 and a control signal 501 (discussed in more detail below). The resulting gain-controlled signal 719, which has now been DC-clamped, controlled for video contrast, controlled for beam signal strength, selectively combined with OSD data, and controlled for video gain, is then selectively combined with a blanking signal in the switch or multiplexor 728. The resulting signal 729 then has a DC offset voltage added to it within the offset circuitry 732 to produce the final video output signal 731.

The output offset circuitry 732 selectively introduces a DC offset voltage by establishing a reference offset voltage 709 at one input of the amplifier 734. This voltage is produced as a combination of the reference voltage 601 summing with the voltage generated in the voltage divider circuit composed of resistors R1 and R2 depending upon the value of the current 706 provided by the current source circuit 704 (e.g., a current digital-to-analog converter) as either a source current 705a or sinking current 705b.

A more detailed discussion of this video signal path can be found in commonly assigned, co-pending U.S. patent application Ser. No. 09/698,739, entitled "Multiplexor Video Signal Interface Signal System and Method", the disclosure of which is incorporated herein by reference.

As can be seen in FIG. 1, the signal gain of the video signal is controlled by a control signal 501. This same control signal 501 also controls the voltage reference generator 600 which provides the common, or shared, reference voltage 601 used to establish and maintain the reference black level of the video signal as it is processed by the various stages. Accordingly, when the video signal gain or the reference black level for the subject video signal is adjusted, a corresponding adjustment is made for the reference black level or video signal gain, respectively, thereby providing mutual tracking for such signal characteristics.

Figure 2:
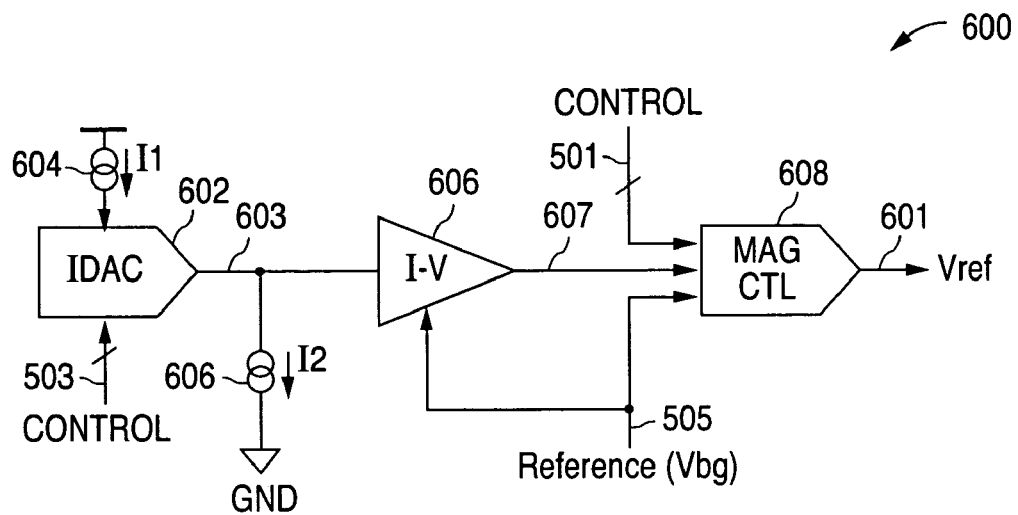
FIG. 2 is a functional block diagram of a voltage reference generator in accordance with one embodiment of the presently claimed invention.

Referring to FIG. 2, a preferred embodiment of the voltage reference generator 600 for use in the circuit of FIG. 1 includes voltage source circuitry and voltage conversion circuitry. One embodiment of the voltage source circuitry includes a current DAC 602 and a current-to-voltage converter 606. In the current DAC 602, a source current I1 provided by a current source 604 is converted to an output current 603 in accordance with a digital control signal 503. This output current 603, variable (e.g., proportional) in accordance with the control signal 603, is summed with a sinking current I2 provided by another current source 606 to produce a net current for conversion by the current-to-voltage converter 606.

The resulting voltage 607 is used as an input voltage for the voltage conversion circuitry, which in this example embodiment, is implemented using a voltage magnitude control circuit 608 which provides the analog reference voltage Vref 601 based upon the input voltage 607 in accordance with the value of the digital control signal 501 (e.g., proportional) which is also used to control the video gain, as discussed above. The reference voltage 505, preferably established by a stable voltage source, such as a bandgap voltage source (many types of which are well known in the art), also provides the voltage reference for the current-to-voltage converter 606. The next result is that the reference voltage 601 has a nominal voltage level equal to the reference voltage 505 which can be adjusted upward (more positive) or downward (more negative) in accordance with the binary value of the digital control signal 501 (discussed in more detail below).

This magnitude control circuit 608 used to establish the reference voltage 601 is preferably the same type of circuitry as that used for the video gain controller 718. A more detailed discussion of this type of magnitude control circuit can be found in U.S. Pat. No. 6,166,579, entitled "Digitally Controlled Signal Magnitude Control Circuit", the disclosure of which is incorporated herein by reference.

Figure 3:
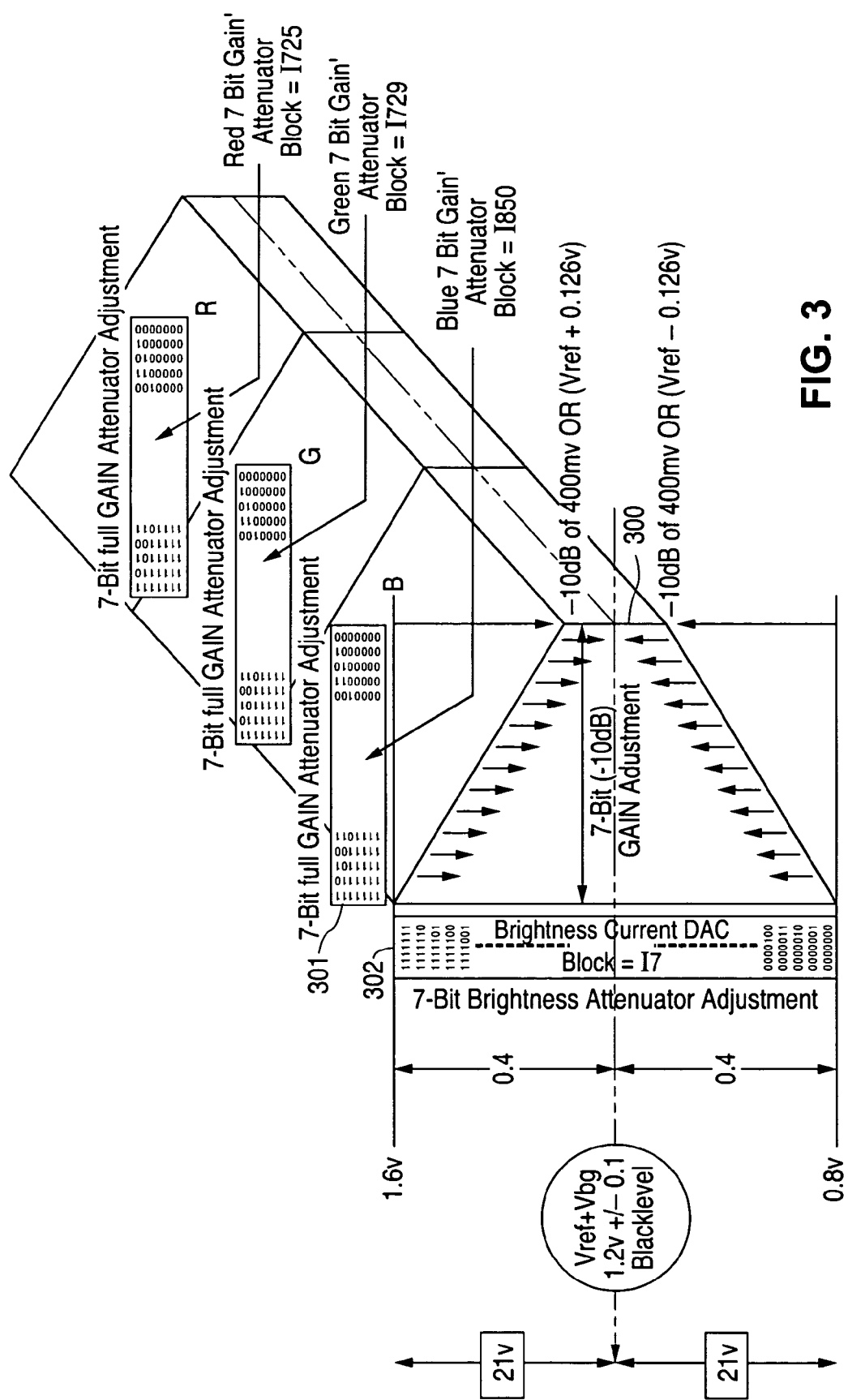
FIG. 3 illustrates the video gain and brightness control adjustment capabilities of the circuit of FIG. 1.

Referring to FIG. 3, the adjustment and tracking of the video signal gain and reference black level can be better understood. As discussed above, the nominal reference black level is equal to the internal reference voltage 505, e.g., 1.2 volts for a bandgap reference voltage. For one embodiment of the circuitry used for the magnitude control circuit 608 and video gain controller 718, the control signal 501 is a 7-bit signal and equal voltage adjustments of 400 millivolts more positive and more negative are available, thereby establishing a reference black level within the range of 0.8 volts through 1.6 volts over the full range of the digital control signal 501. Box 301 identifies the full range of adjustment for the video gain controller 718, which for this example of a 7-bit control signal 501, provides a 10 dB gain adjustment. Box 302 identifies the full range of the 7-bit control signal 501 for controlling the reference black level over the range of 0.8 volts through 1.6 volts. This 800 millivolt adjustment range translates to a 42-volt (+/−21 volts) adjustment range at the cathodes of a typical CRT (not shown).

Figure 4:
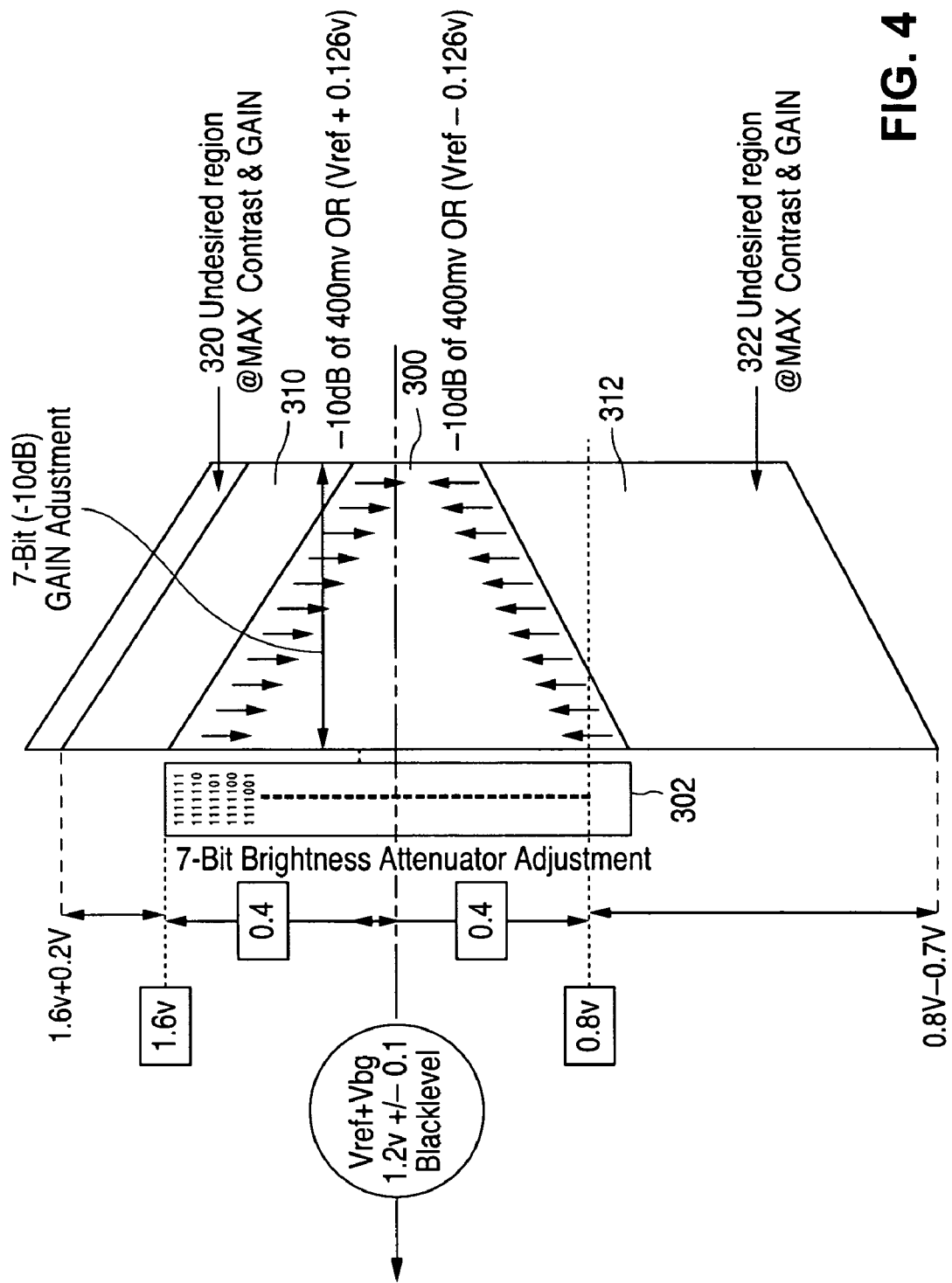
FIG. 4 further illustrates such video gain and brightness control adjustment capabilities.

Referring to FIG. 4, the effect of the output offset circuitry 732 can be better understood. As illustrated, additional output offset voltages in the range of −0.7 volt through +0.2 volt is available to shift the nominal center of the output video signal Vout 731.

Figure 5:
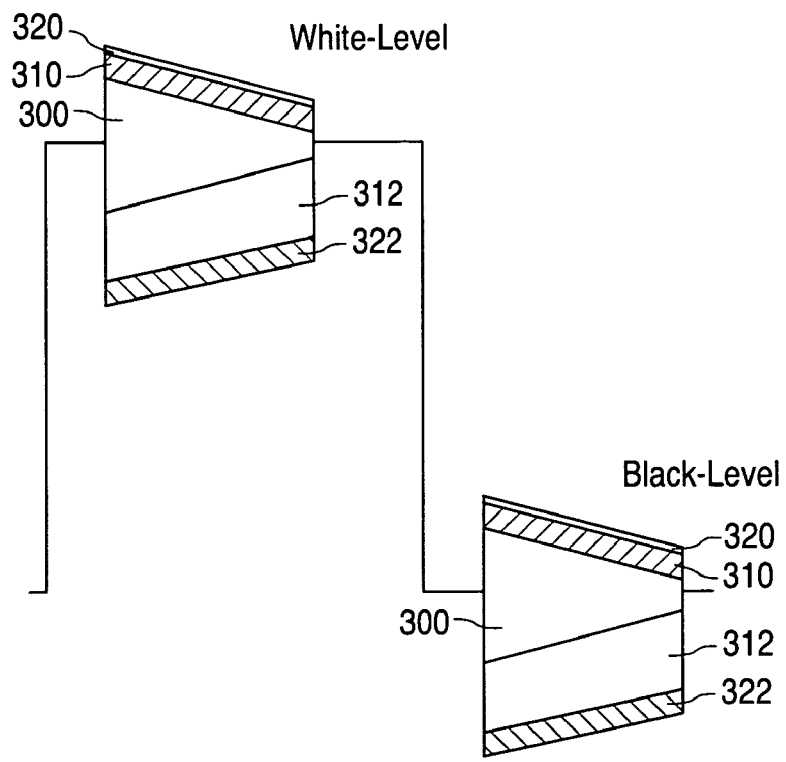
FIG. 5 illustrates the effects of such video gain and brightness control adjustments for the white and black levels of a video signal.

Referring to FIG. 5, the net effect for the white and black levels of the output video signal Vout is illustrated.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should be unduly limited to such specific embodiments. It is intended that the following claims define the scope of the present invention and that structures and methods within the scope of these claims and their equivalents be covered thereby.

What is claimed is:

1. An apparatus including video circuitry for controlling signal gain and reference black level of a video signal, comprising:
   video signal control circuitry responsive to a first video signal, a reference voltage and a digital control signal by providing a second video signal corresponding to said first video signal and having a reference black level determined by a magnitude of said reference voltage, wherein said first video signal has a first magnitude, said second video signal has a second magnitude and a ratio of said first and second video signal magnitudes is determined by said digital control signal; and
   voltage reference generator circuitry coupled to said video signal control circuitry, responsive to said digital control signal by providing said reference voltage with said reference voltage magnitude determined by said digital control signal, and including
   voltage source circuitry to provide an internal voltage having a magnitude, and
   voltage conversion circuitry coupled to said voltage source circuitry and responsive to said internal voltage and said digital control signal by providing said reference voltage, wherein a ratio of said internal and reference voltage magnitudes is determined by said digital control signal.

2. The apparatus of claim 1, wherein said voltage source circuitry comprises digital-to-analog conversion (DAC) circuitry responsive to at least one reference current and a digital reference signal by providing an analog voltage as said internal voltage.

3. The apparatus of claim 1, wherein said voltage conversion circuitry comprises digital-to-analog conversion (DAC) circuitry.

4. An apparatus including video circuitry for controlling signal gain and reference black level of a video signal, comprising:
   video signal control circuitry responsive to a first video signal, a reference voltage and a digital control signal by providing video signal corresponding to said first video signal and having a reference black level determined by a magnitude of said reference voltage, wherein said first video signal has a first magnitude, said second video signal has a second magnitude and a ratio of said first and second video signal magnitudes is determined by said digital control signal;
   voltage reference generator circuitry coupled to said video signal control circuitry and responsive to said digital control signal by providing said reference voltage with said reference voltage magnitude determined by said digital control signal; and
   blanking circuitry coupled to said video signal control circuitry and responsive to a blanking control signal by selectively combining said second video signal and a video blanking signal.

5. An apparatus including video circuitry for controlling signal gain and reference black level of a video signal, comprising:
   video signal control circuitry responsive to a first video signal, a reference voltage and a digital control signal by providing a second video signal corresponding to said first video signal and having a reference black level determined by a magnitude of said reference voltage, wherein said first video signal has a first magnitude, said second video signal has a second magnitude and a ratio of said first and second video signal magnitudes is determined by said digital control signal;
   voltage reference generator circuitry coupled to said video signal control circuitry and responsive to said digital control signal by providing said reference voltage with said reference voltage magnitude determined by said digital control signal, and
   voltage offset circuitry coupled to said video signal control circuitry and responsive to said second video signal said reference voltage and an offset control signal by selectively adding an offset voltage to said second video signal.

6. An apparatus including video circuitry for controlling signal gain and reference black level of a video signal, comprising:
   video signal control circuitry responsive to a first video signal, a reference voltage and a digital control signal by providing a second video signal corresponding to said first video signal and having a reference black level determined by a magnitude of said reference voltage, wherein said first video signal has a first magnitude, said second video signal has a second magnitude and a ratio of said first and second video signal magnitudes is determined by said digital control signal;
   voltage reference generating circuitry couple to said video signal control circuitry and responsive to said digital control signal by providing and reference voltage with said reference voltage magnitude determined by said digital control signal; and
   input video control circuitry coupled to said video signal control circuitry and responsive to an input video signal and said reference voltage by providing said first video signal with said reference black level.

7. The apparatus of claim 6, wherein said input video control circuitry comprises video clamp circuitry responsive to said reference voltage by clamping said first video signal at said reference black level.

8. The apparatus of claim 7, wherein said input video control circuitry further comprises video contrast control circuitry coupled to said video clamp circuitry and responsive to said reference voltage and a contrast control signal by establishing a contrast for said first video signal.

9. The apparatus of claim 8, wherein said input video control circuitry further comprises on-screen-display (OSD) circuitry coupled to at least one of said video clamp circuitry and video contrast control circuitry, and responsive to said reference voltage and an OSD control signal by selectively combining an OSD signal and said first video signal.

10. An apparatus including video circuitry for controlling signal gain and reference black level of a video signal, comprising:
   video signal controller means for responding to a first video signal, a reference voltage and a digital control signal by generating a second video signal corresponding to said first video signal and having a reference black level determined by a magnitude of said reference voltage, wherein said first video signal has a first magnitude, said second video signal has a second magnitude and a ratio of said first and second video signal magnitudes is determined by said digital control signal;

voltage reference generator means for responding to said digital control signal by generating said reference voltage with said reference voltage magnitude determined by said digital control signal; and blanking means for responding to a blanking control signal by selectively combining and second video signal and a video blanking signal.

11. An apparatus including a video circuitry for controlling signal gain and reference black level of a video signal, comprising:

video signal controller means for responding to a first video signal, a reference voltage and a digital control signal by generating a second video signal corresponding to said first video signal and having a reference black level determined by a magnitude of said reference voltage, wherein said first video signal has a first magnitude, said second video signal has a second magnitude and a ratio of said first and second video signal magnitude is determined by said digital control signal;

voltage reference generator means for responding to said digital control signal by generating said reference voltage with said reference voltage magnitude determined by said digital control signal; and voltage offset means for responding to said second video signal, said reference voltage and an offset control signal by selectively adding an offset voltage to said second video signal.

12. An apparatus including video circuitry for controlling signal gain and reference black level of a video signal, comprising:

video signal controller means for responding to a first video signal, a reference voltage and a digital control signal by generating a second video signal corresponding to said first video signal and having a reference black level determined by a magnitude of said reference voltage, wherein said first video signal has a first magnitude, said second video signal has a second magnitude and a ratio of said first and second video signal magnitudes is determined by said digital control signal;

voltage reference generator means for responding to said digital control signal by generating said reference voltage with said reference voltage magnitude determined by said digital control signal; and input video controller means for responding to an input video signal and said reference voltage by generating said first video signal with said reference black level.

13. A method for controlling signal gain and reference black level of a video signal, comprising:

receiving a first video signal having a first magnitude;

receiving a digital control signal, generating a reference voltage with a magnitude determined by said digital control signal;

generating a second video signal having a second magnitude corresponding to said first video signal and having a reference black level determined by a magnitude of said reference voltage, wherein a ratio of said first and second video signal magnitudes is determined by said digital control signal; and selectively combining said second video signal and a video blanking signal.

14. A method for controlling signal gain and reference black level of a video signal, comprising:

receiving a first video signal having a first magnitude;

receiving a digital control signal;

generating a reference voltage with a magnitude determined by said digital control signal;

generating a second video signal having a second magnitude, corresponding to said first video signal and having a reference black level determined by a magnitude of said reference voltage, wherein a ratio of said first and second video signal magnitude is determined by said digital control signal; and selectively adding an offset voltage to said second video signal.

* * * * *

UNITED STATES PATENT AND TRADEMARK OFFICE
CERTIFICATE OF CORRECTION

PATENT NO. : 7,236,203 B1 Page 1 of 1
APPLICATION NO. : 10/830338
DATED : June 26, 2007
INVENTOR(S) : Peyman Hojabri It is certified that error appears in the above-identified patent and that said Letters Patent is hereby corrected as shown below:

At patent column 1, line 23, please delete "scaning" and insert --scanning--;

At patent column 3, line 47, please delete "706" and insert --705--;

At patent column 4, line 8, please delete "603" and insert --503--;

At patent column 4, line 23, please delete "next" and insert --net--;

At patent column 5, line 2, please delete "it should be" and insert --it should not be--;

At patent claim 4 column 5, line 47, please delete "by providing video" and insert --by providing a second video--;

At patent claim 6 column 6, line 35, please delete "and" and insert --said--;

At patent claim 11 column 7, line 22, please delete "magnitude" and insert --magnitudes--;

At patent claim 11 column 7, line 29, please delete "and" and insert --said--; and At patent claim 14 column 8, line 36, please delete "magnitude" and insert --magnitudes--.

Signed and Sealed this

Twenty-eighth Day of August, 2007

JON W. DUDAS
*Director of the United States Patent and Trademark Office*